United States Patent
Wang et al.

(10) Patent No.: US 9,977,511 B2
(45) Date of Patent: May 22, 2018

(54) PEEP-PROOF INPUT KEYBOARD FOR POS (POINT OF SALE) MACHINE

(71) Applicant: PAX COMPUTER TECHNOLOGY (SHENZHEN) CO., LTD., Shenzhen (CN)

(72) Inventors: Yuzhuo Wang, Shenzhen (CN); Zhiqiang Huang, Shenzhen (CN)

(73) Assignee: PAX COMPUTER TECHNOLOGY (SHENZHEN) CO., LTD., Shenzhen, Guangdong (CN)

(*) Notice: Subject to any disclaimer, the term of this patent is extended or adjusted under 35 U.S.C. 154(b) by 0 days. days.

(21) Appl. No.: 15/108,458

(22) PCT Filed: May 28, 2015

(86) PCT No.: PCT/CN2015/080108
§ 371 (c)(1),
(2) Date: Nov. 21, 2016

(87) PCT Pub. No.: WO2016/187881
PCT Pub. Date: Dec. 1, 2016

(65) Prior Publication Data
US 2017/0068329 A1   Mar. 9, 2017

(51) Int. Cl.
*G06F 3/02* (2006.01)
*G07G 1/12* (2006.01)
(Continued)

(52) U.S. Cl.
CPC .......... *G06F 3/0219* (2013.01); *G06F 3/0202* (2013.01); *G07F 7/02* (2013.01);
(Continued)

(58) Field of Classification Search
CPC .......... G06F 3/02; G06F 3/021; G06F 3/0202; G06F 3/0219
(Continued)

(56) References Cited

U.S. PATENT DOCUMENTS 5,748,728 A * 5/1998 Ginsberg ............... H04M 1/18
                                                                    379/447
8,870,063 B1 * 10/2014 Block ................. G06Q 20/102
                                                                    235/375
(Continued)

FOREIGN PATENT DOCUMENTS

CN           2809832         8/2006
CN         201489599         5/2010
(Continued)

OTHER PUBLICATIONS

International Search Report for International Application No. PCT/CN2015/080108, dated Mar. 3, 2016, total 12 pages.

*Primary Examiner* — Alexander Eisen
*Assistant Examiner* — Nelson Lam
(74) *Attorney, Agent, or Firm* — Hamre, Schumann, Mueller & Larson, P.C.

(57) ABSTRACT

The present invention is applicable to the field of POS machines, and provides a peep-proof input keyboard and a POS machine using the peep-proof input keyboard. The peep-proof input keyboard comprises a circuit board, a keyboard, and a peep-proof cover, the keyboard includes a plurality of keys configured to input information, a portion of the circuit board corresponding to the keys is provided with a first connecting finger configured for the pressing operations of the keys, the circuit board is provided with a second connecting finger configured to control the keyboard to work and be turned off, and a bottom of the peep-proof cover is provided with at least one support post configured to abut against the second connecting finger so as to enable the keyboard to work. By providing the circuit board with the second connecting finger, whether the keyboard can work or not is controlled by connection and disconnection of the second connecting finger; and by providing the peep-proof cover with the support post, the second connecting (Continued)

finger is connected by the support post, such that the keyboard can perform the input work. When the peep-proof cover falls off, the keyboard is in a shut-down state, that is, the keyboard cannot perform the input operation, so that the information input by users is prevented from being peeped.

16 Claims, 4 Drawing Sheets

(51) Int. Cl.
    *G07F 7/02*     (2006.01)
    *H01H 13/86*     (2006.01)

(52) U.S. Cl.
    CPC .............. *G07G 1/12* (2013.01); *H01H 13/86* (2013.01); *H01H 2231/006* (2013.01); *H01H 2239/032* (2013.01)

(58) Field of Classification Search
    USPC .................................................. 345/168–179
    See application file for complete search history.

(56) References Cited

U.S. PATENT DOCUMENTS

| | | | |
|---|---|---|---|
| 9,152,239 B2* | 10/2015 | Zhu ....................... | H01H 13/704 |
| 2006/0151596 A1* | 7/2006 | Scanlon ................. | G07F 19/20 |
| | | | 235/379 |
| 2006/0151597 A1* | 7/2006 | Scanlon ................. | G07F 19/20 |
| | | | 235/379 |
| 2009/0141008 A1* | 6/2009 | Johnson ................. | G06F 3/041 |
| | | | 345/179 |
| 2009/0218203 A1* | 9/2009 | Taverner ................ | H01H 13/84 |
| | | | 200/304 |
| 2010/0097435 A1* | 4/2010 | Henry ....................... | B41J 3/36 |
| | | | 347/171 |
| 2010/0172033 A1* | 7/2010 | Radford ................ | G06F 3/0219 |
| | | | 359/743 |
| 2012/0328350 A1* | 12/2012 | Taverner ................... | G07F 7/10 |
| | | | 400/714 |
| 2013/0069784 A1* | 3/2013 | Koike ................... | G07F 19/205 |
| | | | 340/568.1 |
| 2014/0118971 A1* | 5/2014 | Zhu ...................... | H01H 13/704 |
| | | | 361/757 |
| 2016/0253526 A1* | 9/2016 | McFall ................... | G06F 21/83 |
| | | | 726/34 |
| 2017/0169410 A1* | 6/2017 | Wang ..................... | G06Q 20/20 |
| 2017/0169416 A1* | 6/2017 | Wang ................... | G06Q 20/208 |

FOREIGN PATENT DOCUMENTS

| | | |
|---|---|---|
| CN | 201622951 | 11/2010 |
| CN | 101944244 | 1/2011 |
| CN | 204759630 | 11/2015 |
| JP | 2008198149 | 8/2008 |
| WO | 1999036890 | 7/1999 |

\* cited by examiner

PEEP-PROOF INPUT KEYBOARD FOR POS (POINT OF SALE) MACHINE

FIELD OF THE INVENTION

The present invention relates to the technical field of POS (Point Of Sale) machines, and more particularly to a peep-proof input keyboard and a POS machine using the peep-proof input keyboard.

BACKGROUND OF THE INVENTION

Magcard payment is used more and more widely, and POS machines are used more and more. The use of a POS machine directly relates to personal private account information of users. At the same time, when a POS machine is used, private information, such as a password, generally needs to be input by means of a keyboard. When a keyboard is used, a hand of a user generally extends from a side of the keyboard to the keyboard and then presses buttons of the keyboard to input information. This may results in gaps existing between side edges of the hand and other three side edges of the keyboard, and the information input by the user is prone to be peeped through these gaps. Therefore, in order to improve the security of keyboard input, a casing of a POS machine is often provided thereon with a peep-proof cover, which is configured to cover the other three side edges of the keyboard and thereby prevent users from being peeped when they are inputting information. However, a conventional peep-proof cover usually directly covers a casing of a POS machine; when the POS machine is used, the peep-proof cover may be often hit or shook, and it is prone to lead to falling of the peep-proof cover. A POS machine of which a peep-proof cover has fallen off is easy to be peeped when a user inputs information into the POS machine, and this may result in that the user information is stolen.

SUMMARY OF THE INVENTION

A purpose of the present invention is to provide a peep-proof input keyboard, which is aimed at solve the problem that when a peep-proof cover of a conventional POS machine has fallen off, information input into the POS machine by users is easy to be peeped.

The present invention is realized by the following solution: a peep-proof input keyboard, which comprises a circuit board electrically connected with a main board of a POS machine, a keyboard configured to input user information, and a peep-proof cover configured to be mounted on a casing of the POS machine to cover three side edges of the keyboard; wherein, the keyboard includes a plurality of keys configured to input information, a portion of the circuit board corresponding to the keys is provided with a first connecting finger configured for pressing operations of the keys, the circuit board is provided with a second connecting finger configured to control the keyboard to work and be turned off, and the peep-proof cover is provided with at least one support post configured to abut against the second connecting finger so as to enable the keyboard to work.

In the present invention, by providing the circuit board with the second connecting finger, whether the keyboard can work or not is controlled by connection and disconnection of the second connecting finger; and by providing the peep-proof cover with the support post, the second connecting finger is turned on by the support post, such that the keyboard can perform the input work; in this way, when the peep-proof cover falls off, the support post does not abut against the second connecting finger, thus the keyboard is in a turn-off state, that is, the keyboard cannot perform the input operation, so that the information input by users is prevented from being peeped.

Another purpose of the present invention is to provide a POS machine, which comprises a casing, a main board mounted inside the casing, and a magnetic head card module, and further comprises the above-described peep-proof input keyboard; the circuit board of the peep-proof input keyboard is connected with the main board, the circuit board is mounted inside the casing, the keyboard of the peep-proof input keyboard is mounted on the casing, an upper surface of the casing defines at least one opening hole exposing the keys of the keyboard out, and the peep-proof cover of the peep-proof keyboard is mounted on the casing.

The POS machine adopts the above-described input keypad, so that it can be used to input user information more safely, and the input user information can be prevented from being peeped.

DETAILED DESCRIPTION OF THE PREFERRED EMBODIMENT

In order to make the purposes, technical solutions, and advantages of the present invention be clearer, the present invention will be further described in detail hereafter with reference to the accompanying drawings and embodiments. It should be understood that the embodiments described herein are only intended to illustrate but not to limit the present invention.

In the description of the present invention, it needs to be noted that the positions or position relations indicated by position terms such as "middle", "above", "below" "horizontal", "bottom", "inside", "outside", and the like, are position or position relations based on the arrangement of a device being used, and are only intended to describe the present invention conveniently and simplify the description, but do not express or imply that the indicated devices or components must have particular positions or be structured and operated in particular positions, and therefore should not be considered as limitations to the present invention.

Figure 1A:
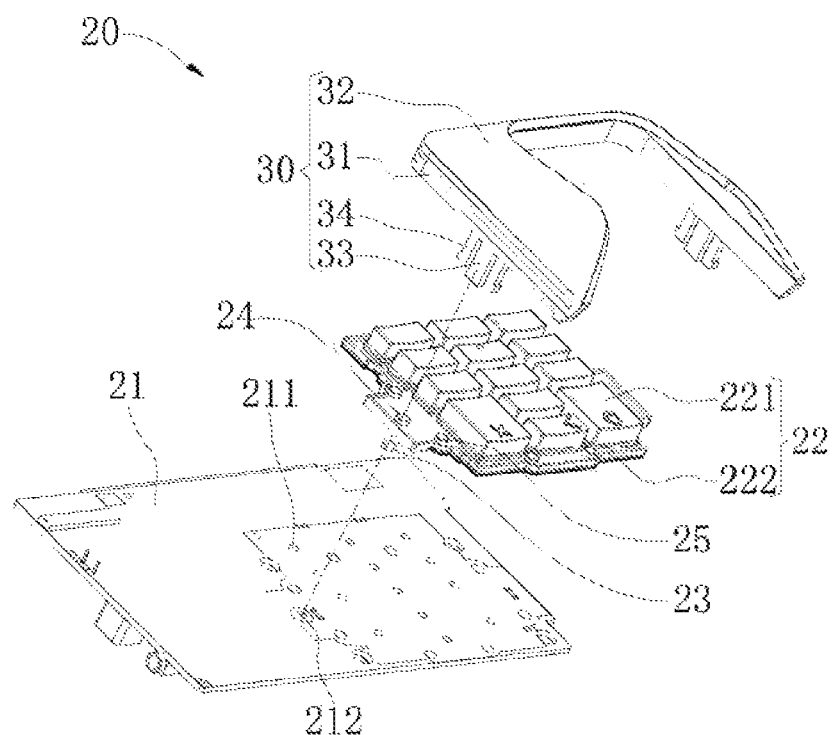
FIG. 1A is a disassembled structural schematic view of a peep-proof input keyboard provided by an embodiment of the present invention.
Figure 1B:
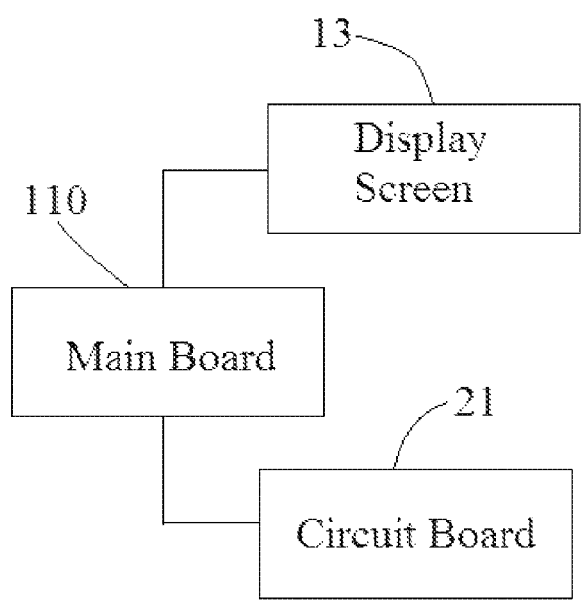
FIG. 1B is a block diagram showing a connection between a circuit board of the peep-proof input keyboard shown in FIG. 1A and the main board, and a connection between the main board and a display screen of the peep-proof input keyboard shown in FIG. 1A.
Figure 2:
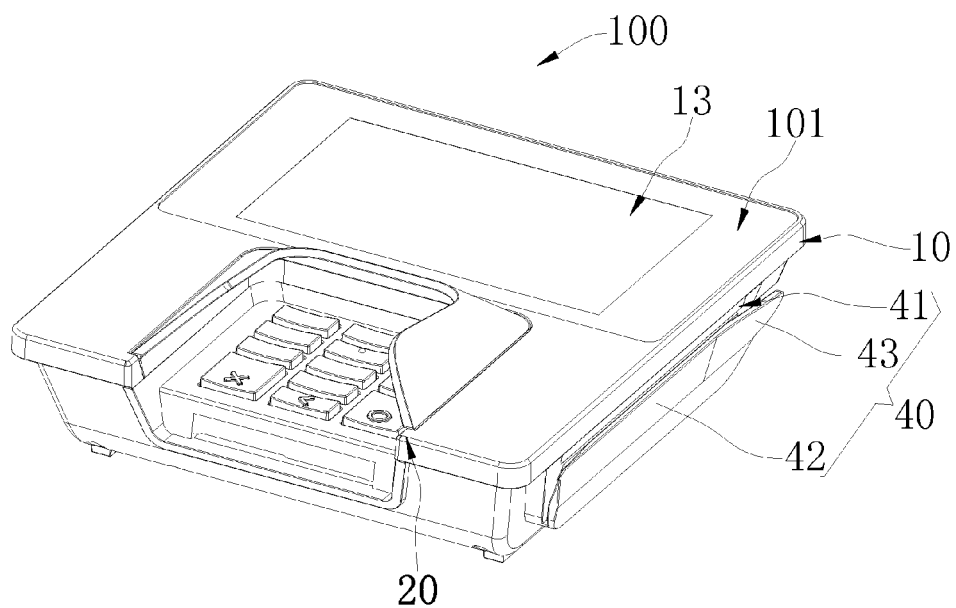
FIG. 2 is a perspective structural schematic view of a POS machine provided by an embodiment of the present invention.
Figure 3:
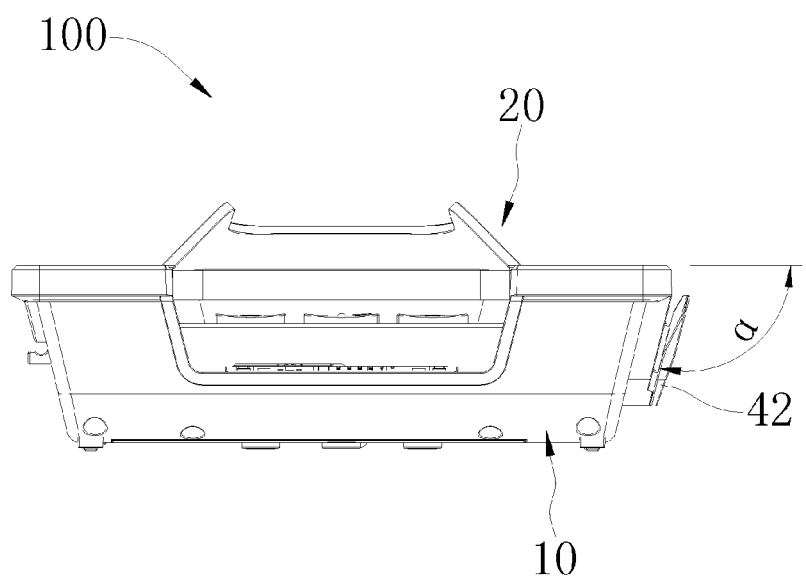
FIG. 3 is a frontal structural schematic view of the POS machine shown in FIG. 2.

Please refer to FIG. 1A, FIG. 1B, and FIG. 2, an embodiment of the present invention provides a peep-proof input keyboard 20, which comprises a circuit board 21, a keyboard 22, and a peep-proof cover 30. The circuit board 21 is configured to be electrically connected with a main board 110 of a POS machine 100, so that information input by the keyboard 22 can be input to the POS machine 100. The keyboard 22 includes a plurality of keys 221 configured to input information, and the keys 221 can be used to input user information. The peep-proof cover 30 is configured to be mounted on a casing 10 of the POS machine 100; when the keyboard 22 is mounted on the casing 10 of the POS machine 100, the peep-proof cover 30 can cover three side edges of the keyboard 22, so that a user inputting information can be prevented from being peeped through the three side edges of the keyboard 22 by other persons. Only one side edge of the keyboard 22 is not covered by the peep-proof cover 30, so that a hand of a user can easily reach the keyboard 22 to operate the keys 221. A portion of the circuit board 21 corresponding to the keys 221 is provided with a first connecting finger 211 configured for the pressing operations of the keys 221, when a user operates the keys 221, the keys 221 press the corresponding first connecting finger 211 to realize information input. The circuit board 21 is further provided with a second connecting finger 212 configured to control the keyboard 22 to work and be turned off; by connection and disconnection of the second connecting finger 212, the keyboard 22 is controlled to be in a working state that can input information or in a turn-off state that cannot input information. A bottom of the peep-proof cover 30 is provided with at least one support post 33 configured to abut against the second connecting finger 212 so as to enable the keyboard 22 to work. That is, when the support post 33 abuts against the second connecting finger 212, the second connecting finger 212 is turned on, and thus the keyboard 22 is in the working state that can input information; if the peep-proof cover 30 falls off, the support post 33 does not abut against the second connecting finger 12, the second connecting finger 212 is turned off, and thus the keyboard 22 cannot input information, that is, the keyboard 22 is in the turn-off state that cannot be used.

By providing the circuit board 21 with the second connecting finger 212 whether the keyboard 22 can work or not is controlled by connection and disconnection of the second connecting finger 212; and by providing the peep-proof cover 30 with the support post 33, the second connecting finger 212 is turned on by the support post 33, such that the keyboard 22 can perform the input work. In this way, when the peep-proof cover 30 falls off, the support post 33 does not abut against the second connecting finger 212, thus the keyboard 22 is in a turn-off state, that is, the keyboard 22 cannot perform the input operation, so that the information input by users is prevented from being peeped.

Furthermore, in this embodiment, the second connecting finger 212 is positioned in an area of the bottom of the peep-proof cover 30 corresponding to a projection of the circuit board 21. By arranging the location of the second connecting finger 212 to correspond to the bottom of the peep-proof cover 30, the support post 33 can be directly arranged at the bottom of the peep-proof cover 30, so that machining and fabricating can be facilitated, and the force with which the support post 33 abuts against the second connecting finger 212 can be improved at the same time. In other embodiments, it is also possible that a connecting block extends from the bottom of the peep-proof cover 30, and the support post 33 is arranged on the connecting block.

Furthermore, the peep-proof input keyboard 20 further includes a conductive pad 23, and the conductive pad 23 is arranged between the support post 33 and the second connecting finger 212. By means of the conductive pad 23 contacting the second connecting finger 212, the second connecting finger 212 can be turned on, and the machining and fabricating are simple. In other embodiments, a lower portion of the support post 33 can be made of conductive material, so that the support post 33 can be directly used to turn the second connecting finger 212 on. In further other embodiments, the circuit board 21 can be directly provided with a conductive piece, and a middle portion of the conductive piece is located above the second connecting finger 212; when the support post 33 presses the conductive piece, the conductive piece contacts the second connecting finger 212 to turn the second connecting finger 212 on.

In order to ensure good conductivity of the conductive pad 23, the conductive pad 23 can be made of carbon particles. The conductive pad 23 made of carbon particles has a small weight and good conductivity, moreover, when the peep-proof cover 30 is shaken and then drives the conductive pad 23 to move, the second connecting finger 212 will not be worn.

Furthermore, the peep-proof input keyboard 20 further comprises a cushion pad 24 arranged between the support post 33 and the conductive pad 23. By the arrangement of the cushion pad 24, the force with which the support post 33 presses the second connecting finger 212 can be adjusted, so that the circuit board 21 is prevented from being crushed, and a function of protecting the circuit board 21 can be provided. Meanwhile, the cushion pad 24 is arranged to abut against the conductive pad 23, when the peep-proof cover 30 is shaken, a cushion action can be provided by the cushion pad 24, so that the conductive pad 23 is prevented from displacing. The cushion pad 24 can be made of silica gel.

Furthermore, the keyboard 22 further includes a glue pad 222 connecting the plurality of keys 221. The cushion pad 24 is connected with the glue pad 222. By connecting the cushion pad 24 with the glue pad 222, the cushion pad 24 can be better positioned.

Furthermore, the peep-proof cover 30 includes a support plate 31 and a covering sheet 32 obliquely extending from an upper side edge of the support plate 31 to a direction of a middle portion of the keyboard 22; the support plate 31 is configured to be inserted in the casing 10 of the POS machine 100, such that the peep-proof cover 30 is mounted on the casing 10 of the POS machine 100. The support plate 31 surrounds three side edges of the keyboard 22, and the covering sheet 32 covers the three side edges of the keyboard 22 correspondingly; the support post 33 is arranged at a bottom of the support plate 31. In other embodiments, the support plate 31 can surround the whole keyboard 22, and the covering sheet 32 is only arranged on three side edges of an upper side of the support plate 31. In further other embodiments, the covering sheet 32 can be directly arranged, a lower part of the covering sheet 32 is directly fixed on the casing 10 of the POS machine 100, and the support post 33 is directly arranged at a bottom of the covering sheet 32.

Furthermore, the bottom of the support plate 31 is provided with at least one hook 34 configured to be buckled on the casing 10 of the POS machine 100. By the arrangement of the hook 34, the support plate 31 is connected with the casing 10 of the POS machine 100, and the assembly is easy. Correspondingly, the casing 10 defines at least one through hole (not shown in the drawings) configured to be inserted by the hook 34.

Furthermore, the support plate 31 is provided with two hooks 34 arranged on two opposite sides of the support post 33, and the two hooks 34 are arranged symmetrically. By arranging the hooks 34 on the two opposite sides of the support post 33, and arranging the two hooks 34 symmetrically, when the hooks 34 are buckled on the casing 10 of the POS machine 100, the two opposite sides of the support post 33 can be subjected to more uniform forces, such that the support post 33 can better press the second connecting finger 212.

Furthermore, the peep-proof input keyboard 20 further includes an elastic pad 25 configured to abut against a bottom of each hook 34; when the hook 34 is buckled on the casing 10 of the POS machine 100, using the elastic pad 25 to abut against the bottom of the hook 34 can buckle the hook 34 with the casing 10 more stably.

In this embodiment, the elastic pad 25 is connected with the glue pad 222 of the keyboard 22; when the peep-proof cover 30 is attached on the casing 10 of the POS machine 100, the bottom of the hook 34 presses the elastic pad, thus, not only can the hook 34 be buckled on the casing 10 more stably, but also the glue pad 222 can be pressed onto the circuit board 21, thereby fixing the circuit board 21. Furthermore, the glue pad 222, the elastic pad 25, and the cushion pad 24 can be integrated, and the machining and fabricating are simple and convenient.

Please refer to FIG. 1A, FIG. 1B, FIG. 2, and FIG. 3, one embodiment of the present invention provides a POS machine 100, which comprises a casing 10, a main board 110, a magnetic head card module 40, and the aforesaid peep-proof input keyboard 20; the main board 110 is mounted inside the casing 10, and the main board 110 is protected by the casing 10; the magnetic head card module 40 is mounted at a side of the casing 10 so as to read user information on a card when the card is swiped; the circuit board 21 of the peep-proof input keyboard 20 is mounted inside the casing 10, and is connected with the main board 110; the keyboard 22 of the peep-proof input keyboard 20 is mounted on the casing 10, and correspondingly, an upper surface of the casing 10 defines at least one opening hole (not labeled) exposing the keys 221 of the keyboard 22 out, so that a user can operate the keys 221; the peep-proof cover 30 of the peep-proof input keyboard 20 is mounted on the casing 10.

The POS machine 100 uses the aforesaid peep-proof input keyboard 20, and therefore it can use input user information more safely and prevent information input by users from being peeped.

Furthermore, the magnetic head card module 40 includes a card swiping module 41 configured to read information on a card and a clamping board 42 configured to cooperate with the card swiping module 41 to clamp the card and thereby guide the card, a lower side of the clamping board 42 is fixedly connected with the casing 10. By the arrangement of the clamping board 42, the card can be guided to slide on the card module, so as to better execute the card swiping operation. Meanwhile, the clamping board 42 can further provide the function of protecting the card swiping module 41.

Furthermore, the clamping board 42 is arranged obliquely with respect to an upper surface 101 of the casing 10, and an inclined angle α of the clamping board 42 with respect to the upper surface 101 of the casing 10 ranges from 100 to 120 degrees. When swiping a card, the POS machine 100 is usually placed on a horizontal table, and meanwhile a clamping board 42 of a conventional POS machine 100 is usually positioned vertically; when the card is inserted between the card swiping module 41 and the clamping board 42, the card needs to be positioned vertically; however, when a person positions the card normally, the card may appear a certain angle with respect to a vertical direction, which may result in that the angle of the card needs to be passively adjusted when the card is inserted between the card swiping module 41 and the clamping board 42, and thus the card may be worn. On the contrary, if the range of the inclined angle α of the clamping board 42 with respect to the upper surface 101 of the casing 10 is set to be 100-120 degrees, the amount by which the angle of the card needs to be passively adjusted can be reduced, so that the abrasion of the card can be reduced and a user can feel more comfortable when swiping the card.

Figure 4:
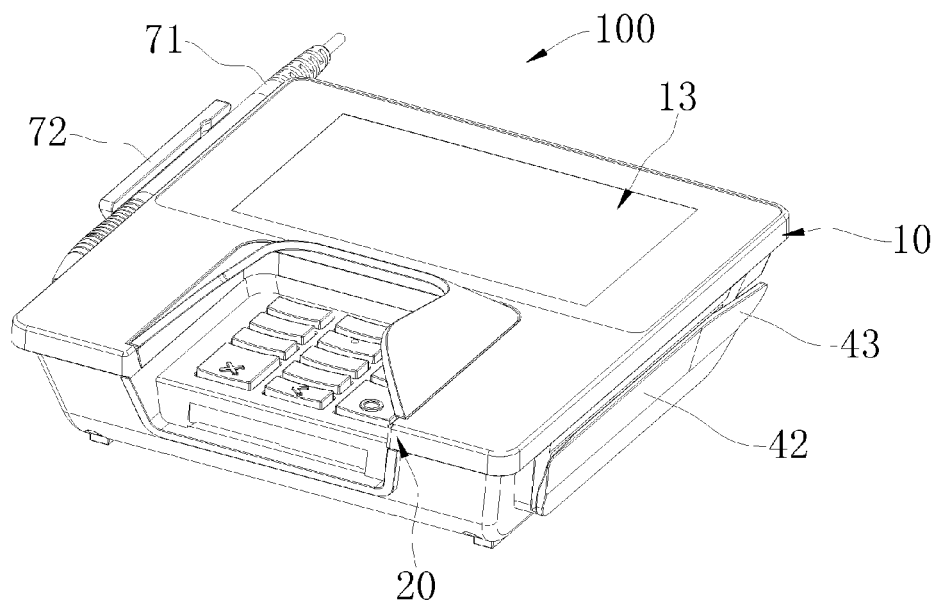
FIG. 4 is a perspective structural schematic view of mounting an electromagnetic pen at one side of the POS machine shown in FIG. 2.
Figure 5:
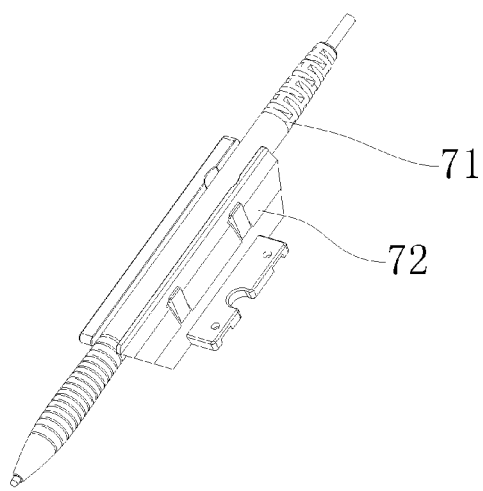
FIG. 5 is an enlarged structural schematic view of the electromagnetic pen and a pen holder shown in FIG. 4.
Figure 6:
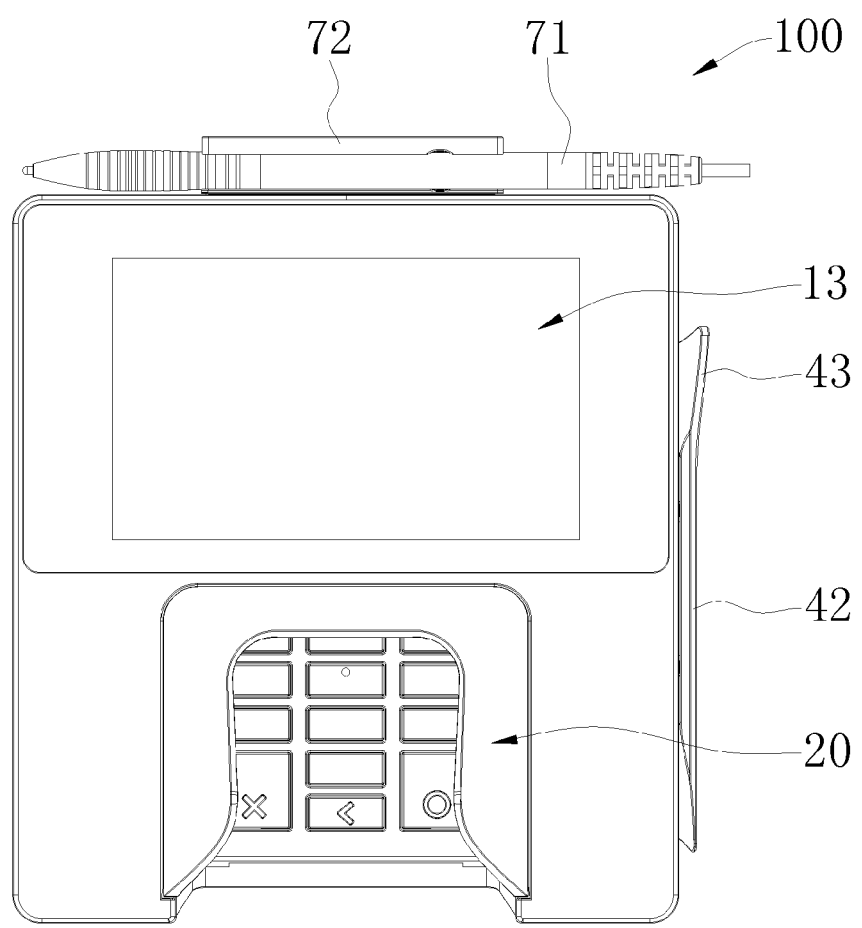
FIG. 6 is a perspective structural schematic view of mounting an electromagnetic pen at another side of the POS machine shown in FIG. 2.

Please refer to FIG. 4, FIG. 5 and FIG. 6, furthermore, one end of the clamping board 42 is provided with a guiding board 43 opening towards a direction that is away from the casing 10. Since the clamping board 42 and the card swiping module 41 need to cooperatively clamp the card so as to guide and adjust the angle of the card, a distance between the clamping board 42 and the card swiping module 41 is small, and a good alignment is required when swiping the card. By the arrangement of the guiding board 43, the card can be guided between the clamping board 42 and the card swiping module 41 more conveniently, thereby facilitating swiping cards and improving the comfort level of swiping cards.

Please refer to FIG. 1B, FIG. 4, FIG. 5, and FIG. 6, furthermore, in order to help users view in use, the casing 10 is further provided thereon with a display screen 13, and the display screen 13 is electrically connected with the main board 110. By the arrangement of the display screen 13, information, such as consumption, can be displayed, which is more intuitive and convenient. Additionally, the display screen 13 can be a touch screen, so that users can operate and use more conveniently.

In this embodiment, the display screen 13 is an electromagnetic display screen. The POS machine 100 further includes an electromagnetic pen 71 configured to input information on the electromagnetic display screen. By the use of the electromagnetic display screen and the electromagnetic pen 71, users can sign more conveniently, so that electronic operation is improved and use of paper is reduced, which is more environmentally friendly and more convenient.

Furthermore, a penholder 72 configured to clamp the electromagnetic pen 71 is mounted at a side of the casing 10. By the arrangement of the penholder 72, the electromagnetic pen 71 can be positioned conveniently. In this embodiment, the penholder 72 is fixed on the casing 10 by screws, and the casing 10 defines screw holes correspondingly. Please refer to FIG. 4, the penholder 72 can be mounted on a left side of the POS machine 100. The clamping board 42 and the penholder 72 are respectively located at two opposite sides of the casing 10. In other embodiments, please refer to FIG. 6, the penholder 72 can be mounted at a rear side of the POS machine 100, such that the mounting location of the penholder 72 can be determined according to various locations for positioning the POS machine 100, and users can use conveniently.

The above are only preferred embodiments of the present invention and are not intended to limit the present invention. Any modification, equivalent replacement, and improvement made within the spirit and principle of the present invention should be included in the protection scope of the present invention.

What is claimed is:

1. A peep-proof input keyboard, comprising:
   a circuit board electrically connected with a main board of a POS (Point of Sale) machine;
   a keyboard configured to input user information; and a peep-proof cover configured to be mounted on a casing of the POS machine to cover three side edges of the keyboard, wherein the keyboard includes a plurality of keys configured to input information, a portion of the circuit board corresponding to the keys is provided with a first connecting finger configured for pressing operations of the keys, the circuit board is provided with a second connecting finger configured to control the keyboard to operate and be turned off, the peep-proof cover is provided with at least one support post configured to abut against the second connecting finger so as to enable the keyboard to work, the peep-proof cover includes a support plate configured to be inserted in the casing of the POS machine and a covering sheet obliquely extending from an upper side edge of the support plate to a direction of a middle portion of the keyboard, the support plate surrounds three side edges of the keyboard, the covering sheet covers the three side edges of the keyboard correspondingly, and the support post is arranged at a bottom of the support plate.

2. The peep-proof input keyboard according to claim 1, wherein, the second connecting finger is positioned in an area of a bottom of the peep-proof cover corresponding to a projection of the circuit board.

3. The peep-proof input keyboard according to claim 1, wherein, the peep-proof input keyboard further comprises a conductive pad abutting against the second connecting finger, and the conductive pad is arranged between the support post and the second connecting finger.

4. The peep-proof input keyboard according to claim 3, wherein, the conductive pad is made of carbon particles.

5. The peep-proof input keyboard according to claim 3, wherein, the peep-proof input keyboard further comprises a cushion pad arranged between the support post and the conductive pad.

6. The peep-proof input keyboard according to claim 5, wherein, the keyboard further includes a glue pad connecting the plurality of keys, and the cushion pad is connected with the glue pad.

7. The peep-proof input keyboard according to claim 1, wherein, a bottom of the support plate is provided with at least one hook configured to be buckled on the casing of the POS machine.

8. The peep-proof input keyboard according to claim 7, wherein, the support plate is provided with two hooks arranged on two opposite sides of the support post, and the two hooks are arranged symmetrically.

9. The peep-proof input keyboard according to claim 7, wherein, the peep-proof input keyboard further comprises an elastic pad configured to abut against a bottom of each hook such that the hook is fixedly connected with the casing of the POS machine.

10. The POS machine, comprising:
the casing;
the main board mounted inside the casing; and
a magnetic head card module mounted at a side of the casing,
wherein the POS machine further comprises the peep-proof input keyboard according to claim 1,
the circuit board of the peep-proof input keyboard is connected with the main board,
the circuit board is mounted inside the casing,
the keyboard of the peep-proof input keyboard is mounted on the casing,
an upper surface of the casing defines at least one opening hole exposing the keys of the keyboard out, and
the peep-proof cover of the peep-proof input keyboard is mounted on the casing.

11. The POS machine according to claim 10, wherein, the magnetic head card module includes a card swiping module configured to read information on a card and a clamping board configured to cooperate with the card swiping module to clamp the card and thereby guide the card, a lower side of the clamping board is fixedly connected with the casing.

12. The POS machine according to claim 11, wherein, the clamping board is arranged obliquely with respect to an upper surface of the casing, and an inclined angle of the clamping board with respect to the upper surface of the casing ranges from 100 to 120 degrees.

13. The POS machine according to claim 12, wherein, one end of the clamping board is provided with a guiding board opening towards a direction that is away from the casing.

14. The POS machine according to claim 10, wherein, the casing is provided with a display screen, and the display screen is electrically connected with the main board.

15. The POS machine according to claim 14, wherein, the POS machine further comprises an electromagnetic pen configured to input information on an electromagnetic display screen, and the display screen is the electromagnetic display screen.

16. The POS machine according to claim 15, wherein, a penholder configured to clamp the electromagnetic pen is mounted at a side of the casing.

* * * * *